United States Patent [19]

Baillargeon et al.

[11] Patent Number: 5,271,748

[45] Date of Patent: * Dec. 21, 1993

[54] OLIGOMERIC/POLYMERIC MULTIFUNCTIONAL ADDITIVES TO IMPROVE THE LOW-TEMPERATURE PROPERTIES OF DISTILLATE FUELS

[75] Inventors: David J. Baillargeon, Cherry Hill; Angeline B. Cardis, Florence; Dale B. Heck, West Deptford, all of N.J.; Susan W. Johnson, Centreville, Va.

[73] Assignee: Mobil Oil Corporation, Fairfax, Va.

[*] Notice: The portion of the term of this patent subsequent to Nov. 30, 2010 has been disclaimed.

[21] Appl. No.: 946,222

[22] Filed: Sep. 17, 1992

[51] Int. Cl.$^5$ ............................................. C10L 1/22
[52] U.S. Cl. ............................................. 44/391; 44/387
[58] Field of Search .............................. 44/387, 391

[56] References Cited

U.S. PATENT DOCUMENTS 5,112,937  5/1992  Garapon et al. .................. 44/300
5,156,655 10/1992  Baillargeon et al. ............. 44/391

Primary Examiner—Ellen M. McAvoy
Attorney, Agent, or Firm—Alexander J. McKillop; Malcolm D. Keen; Howard M. Flournoy

[57] ABSTRACT

Additives which improve the low-temperature properties of distillate fuels are the polymeric and/or oligomeric monomers selected from ester/urethane reaction products of a combination of anhydrides and epoxides (or their corresponding acid/diol equivalents), and a urethane precursor and optionally with various suitable reactive materials to provide optional termonomers.

20 Claims, No Drawings

OLIGOMERIC/POLYMERIC MULTIFUNCTIONAL ADDITIVES TO IMPROVE THE LOW-TEMPERATURE PROPERTIES OF DISTILLATE FUELS

CROSS-REFERENCE TO RELATED APPLICATIONS

This application is related to application Ser. No. 07/620,799, filed Dec. 3, 1990.

BACKGROUND OF THE INVENTION

1. Field of the Invention

This application is directed to oligomeric/polymeric multifunctional additives prepared by combining epoxides and anhydrides with a suitable reactive material to provide products useful for improving the low-temperature properties of distillate fuels and to fuel compositions containing same.

2. Description of the Related Art

Traditionally, the low-temperature properties of distillate fuels have been improved by the addition of kerosene, sometimes in very large amounts (5-70 wt %). The kerosene dilutes the wax in the fuel, i.e., lowers the overall weight fraction of wax, and thereby lowers the cloud point, filterability temperature, and pour point simultaneously. The additives of this invention effectively lower both the cloud point and CFPP (Cold Filter Plugging Point) of distillate fuel without any appreciable dilution of the wax component of the fuel.

Other additives known in the art have been used in lieu of kerosene to improve the low-temperature properties of distillate fuels. Many such additives are polyolefin materials with pendent fatty hydrocarbon groups. These additives are limited in their range of activity; however, most improve fuel properties by lowering the pour point and/or filterability temperature. These same additives have little or no effect on the cloud point of the fuel. The additives of this invention effectively lower distillate fuel cloud point, and thus provide improved low-temperature fuel properties, and offer a unique and useful advantage over known distillate fuel additives. No art is known to applicants which teaches or suggests the additive products and compositions of this invention.

BRIEF SUMMARY OF THE INVENTION

Novel polyester and modified polyester oligomers/polymers have been prepared and have been found to be surprisingly active wax crystal modifier additives for distillate fuels. Distillate fuel compositions containing $\leq 0.1$ wt % of such additives demonstrate significantly improved low-temperature flow properties, i.e., lower cloud point and lower CFPP filterability temperature. The additives in accordance with the present invention are prepared from an anhydride, or acid equivalent, an epoxide or diol equivalent and optionally a urethane precursor such as isocyanate, or activated carbamate, or a suitable reactive material, alkyl halide, diepoxide, dianhydride, polyols, etc.

These additives are oligomeric and/or polymeric ester products which have long-chain and/or linear hydrocarbyl pendant groups independently and regularly attached to the backbone of the oligomeric/polymeric structure. Hydrocarbyl as used throughout this application includes alkyl, alkenyl, aryl, aralkyl, alkaryl and optionally may include cyclic and polycyclic of $C_1$ to about $C_{300}$ R groups such as $R_1$, $R_2$, $R_3$, $R_4$, etc. These esters are derived from the polymerization of a suitable combination of monomers which include (1) one or more epoxides, at least one of which is long chain (at least $C_{12}$), (2) one or more anhydrides, and optionally (3) a urethane precursor such as isocyanate, diisocyanate, or activated carbamates, (4) a reactive material, e.g., epoxy halides, diepoxides, carbamates, dianhydride, polyols, etc., which may function as a chain transfer agent, chain terminator, chain propagator, and/or chain cross-linking agent. Alternatively, condensation reaction with removal of water or other such by-product may be employed to make the same oligomeric/polymeric esters from a monomer mixture which may include (1) one or more diols, (2) one or more diacid equivalents (anhydride, diacid, diacid chloride, etc.), and optionally (3) the same reactive materials listed above.

Additionally, the oligomeric and/or polymeric ester products, derived as described above, may be further reacted with additional reagents in a second synthetic step so as to derivatize, cap, or otherwise modify reactive end groups or other pendant groups incorporated along the backbone of the original oligomeric/polymeric ester. These additional reagents may include, for example, amines or alcohols which would serve to convert residual acids and anhydrides in the oligomeric/polymeric ester product to alternate carboxyl derivatives such as amides, imides, salts, esters, etc. Similarly, residual epoxides would be converted to amine and ether adducts. These examples serve to illustrate, but not limit, the concept of post-reacting the original oligomeric/polymeric ester product to modify its original chemical functionality.

These oligomeric/polymeric esters are structurally very different from the known categories of polymeric wax crystal modifiers. Known polymeric wax crystal modifiers are generally radical-chain reaction products of olefin monomers, with the resulting polymer having an all-carbon backbone. The materials of this invention are condensation products of epoxides (or diols) and anhydrides (or acid equivalents) to give polymeric structures where ester functions are regularly spaced along the polymer backbone.

These new additives are especially effective in lowering the cloud point of distillate fuels, and thus improve the low-temperature flow properties of such fuels without the use of any light hydrocarbon diluent, such as kerosene. In addition, the filterability properties are improved as demonstrated by lower CFPP temperatures. Thus, the additives of this invention demonstrate multifunctional activity in distillate fuels.

The compositions of these additives are unique. Also, the additive concentrates and fuel compositions containing such additives are unique. Similarly, the processes for making these additives, additive concentrates, and fuel compositions are unique.

The primary object of this invention is to improve the low-temperature flow properties of distillate fuels. These new additives are especially effective in lowering the cloud point of distillate fuels, and thus improve the low-temperature flow properties of such fuels without the use of any light hydrocarbon diluent, such as kerosene. In addition, the filterability properties are improved as demonstrated by lower CFPP temperatures. Thus, the additives of this invention demonstrate multifunctional activity in distillate fuels.

In general, the reaction products of the present invention may be employed in any amount effective for imparting the desired degree of activity to improve the low temperature characteristics of distillate fuels. In many applications the products are effectively employed in amounts from about 0.001% to about 10% by weight and preferably from less than 0.01% to about 5% of the total weight of the composition.

DESCRIPTION OF THE PREFERRED EMBODIMENTS

The additives of this invention have comb-like structures, where a critical number of linear hydrocarbyl groups are attached to the backbone of an oligomeric/polymeric polyester. These additives are reaction products obtained by combining two, or optionally more, monomers in differing ratios using standard techniques for condensation polymerization. These wax crystal modifiers which are effective in lowering cloud point are generally characterized as alternating co-oligomers/copolymers (or optionally terpolymers, etc.) of the following type:

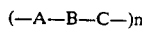

where $n \geq 1$

One combination of monomers may include (A) one or more anhydrides, (B) one or more epoxides, one of which is a long-chain epoxide ($C_{12}$), (C) a urethane precursor such as isocyanate, diisocyanate or activated carbamate, and optionally (D) a reactive material, e.g., alkyl halide, diepoxide, dianhydride, etc., which may function as a chain transfer agent, chain terminator, chain propagator, and/or chain cross-linking agent. Alternatively, a second combination of monomers, in which the removal of a low molecular weight by-product accompanies the condensation reaction, may include (A) one or more diacid equivalents (anhydride, diacid, diacid chloride, etc.), (B) one or more diols, and optionally (C) the same reactive materials listed above. Comonomer stoichiometry may vary widely with $A:B = 1:2$ to $2:1$, or preferably $A:B = 1:1.5$ to $1.5:1$, or most preferably $A:B = 1:1.1$ to $1.1:1$. Comonomer C substitutes for some fraction of comonomer A, generally at $\leq 50\%$ of the molar amount of A in the overall monomer mixture. Optional termonomers, component D, may substitute for some fraction of A or B in the above stoichiometric ranges.

The pendant linear hydrocarbyl groups are carried by at least one, and optionally by more than one, of the monomers. These critical linear pendant hydrocarbyl groups are generally $C_{12}$ or longer.

Additives of this invention may be grouped into categories based on distinct structural and compositional differences, described below. Preparation of selected additives are given in EXAMPLES 1 and 2. Additive compositions and their respective performance for cloud point and CFPP are given in TABLE 1.

CATEGORY A: EPOXIDE, ANHYDRIDE, AND ISOCYANATE MIXTURES (TABLE 1)

Successful additives may be ABC-type oligomers/polymers which can be prepared from an anhydride (A monomer), a long-chain epoxide (B monomer), and an isocyanate (C monomer). The reaction products derived from such a mixture of reactants are modified oligomeric/polymeric esters containing urethane functional groups. No structural limitations are imposed on the isocyanate monomer component. The isocyanate is generally the minor component relative to the anhydride and may be present at 0.001 wt % or higher. For example, reactant mixtures may include aromatic isocyanates, e.g., phenylisocyanate, Entries 75–76, or alkyl isocyanates, e.g., octadecyl isocyanate, Entries 78–79. By comparison, the composition where the anhydride is excluded (see Entry 77) has low additive activity. Thus, the full epoxide/anhydride/isocyanate has a demonstrable advantage over those compositions where one of the components is missing.

A typical synthesis is illustrated by the alkyl isocyanate-modified oligomers/polymers for Entry 78, in EXAMPLE 1.

CATEGORY B: EPOXIDE, ANHYDRIDE, AND ISATOIC ANHYDRIDE MIXTURES (TABLE 1)

Successful additives may be ABC-type oligomers/polymers which can be prepared from an anhydride (A monomer), a long-chain epoxide (B monomer), and isatoic anhydride (C monomer). The reaction products derived from such a mixture of reactants are modified oilgomeric/polymeric esters containing urethane functional groups (similar to those in Category A). However, isatoic anhydride is a uniquely reactive source of the urethane or carbamate functional group which is ultimately incorporated into the reaction product. The isatoic anhydride is generally the minor component relative to the anhydride and may be present at 0.001 wt % or higher. For example, reactant mixtures may include different types of anhydrides, e.g., aromatic anhydrides; or alkyl succinic anhydrides. By comparison, the composition in which isatoic anhydride and epoxide are used alone, without the accompanying anhydride, has low additive activity (see Entry 80).

A typical synthesis is illustrated by the isatoic anhydride-modified oligomers/polymers for Entry 83, in EXAMPLE 2.

The reactions can be carried out under widely varying conditions which are not believed to be critical. The reaction temperatures can vary from about 100° to 225° C., preferably 110° to 180° C., under ambient or autogenous pressure. However, slightly higher pressures may be used if desired. The temperatures chosen will depend upon for the most part on the particular reactants and on whether or not a solvent is used. Reactions may also be run without any solvents at all. But if a solvent is used, it will typically be a hydrocarbon solvent such as xylene, but any non-polar, unreactive solvent can be used including benzene and toluene and/or mixtures thereof.

Molar ratios, less than molar ratios or more than molar ratios of the reactants can be used.

The times for the reactions are also not believed to be critical. The process is generally carried out in from about one to twenty-four hours or more.

In general, the reaction products of the present invention may be employed in any amount effective for imparting the desired degree of activity to improve the low temperature characteristics of distillate fuels. In many applications the products are effectively employed in amounts from about 0.001% to about 10% by weight and preferably from less than 0.01% to about 5% of the total weight of the composition.

These additives may be used in conjunction with other known low-temperature fuel additives (dispersants, etc.) being used for their intended purpose.

The fuels contemplated are liquid hydrocarbon combustion fuels, including the distillate fuels and fuel oils. Accordingly, the fuel oils that may be improved in accordance with the present invention are hydrocarbon fractions having an initial boiling point of at least about 250° F. and an end-boiling point no higher than about 750° F. and boiling substantially continuously throughout their distillation range. Such fuel oils are generally known as distillate fuel oils. It is to be understood, however, that this term is not restricted to straight run distillate fractions. The distillate fuel oils can be straight run distillate fuel oils, catalytically or thermally cracked (including hydrocracked) distillate fuel oils, or mixtures of straight run distillate fuel oils, naphthas and the like, with cracked distillate stocks. Moreover, such fuel oils can be treated in accordance with well-known commercial methods, such as, acid or caustic treatment, hydrogenation, solvent refining, clay treatment, etc.

The distillate fuel oils are characterized by their relatively low viscosities, pour points, and the like. The principal property which characterizes the contemplated hydrocarbons, however, is the distillation range. As mentioned hereinbefore, this range will lie between about 250° F. and about 750° F. Obviously, the distillation range of each individual fuel oil will cover a narrower boiling range falling, nevertheless, within the above-specified limits. Likewise, each fuel oil will boil substantially continuously throughout its distillation range.

Contemplated among the fuel oils are Nos. 1, 2 and 3 fuel oils used in heating and as diesel fuel oils, and the jet combustion fuels. The domestic fuel oils generally conform to the specification set forth in A.S.T.M. Specifications D396-48T. Specifications for diesel fuels are defined in A.S.T.M. Specification D975-48T. Typical jet fuels are defined in Military Specification MIL-F-5624B.

The following examples are illustrative only and are not intended to limit the scope of the invention.

EXAMPLE 1

Preparation of Additive Entry 78

Phthalic anhydride (26.7 g, 0.18 mol; e.g., from Aldrich Chemical Co.), octadecylisocyanate (6.11 g, 0.02 mol; e.g., from Aldrich Chemical Co.), 1,2-epoxyoctadecane (57.0 g, 0.20 mol; e.g., Vikolox 18 from Viking Chemical), triethylamine (0.61 g, 0.006 mol; e.g., from Aldrich Chemical Co.), and 4-dimethylaminopyridine (0.12 g, 0.0010 mol; e.g., DMAP from Nepera, Inc.) were combined and heated at 110° C./26 hours and 140° C./20 hours. The reaction mixture was then hot filtered through a mixed bed of alumina (approximately 20%) and Celite to give 80.2 g of the final product.

EXAMPLE 2

Preparation of Additive Entry 83

$C_{18}$–$C_{24}$ Alkyl succinic anhydride (56.8 g, 0.112 mol), isatoic anhydride (2.12 g, 0.0125 mol; e.g., from PMC, Inc.), 1,2-epoxyoctadecane (35.6 g, 0.125 mol; e.g., Vikolox 18 from Viking Chemical), triethylamine (0.25 g, 0.0025 mol; e.g., from Aldrich Chemical Co.), and 4-dimethylaminopyridine (0.08 g, 0.0006 mol; e.g., DMAP from Nepera, Inc.) were combined and heated at 110° C./5 hours and 140° C./17 hours. The reaction mixture was then hot filtered through a mixed bed of alumina (approximately 20%) and Celite to give 84.8 g of the final product.

PREPARATION OF ADDITIVE CONCENTRATE

A concentrate solution of 100 ml total volume was prepared by dissolving 10 g of additive in mixed xylenes solvent. Any isoluble particulates in the additive concentrate were removed by filtration before use.

TEST FUEL

The following test fuel was used for the screening of additive activity:

| API Gravity | | 31.5 |
|---|---|---|
| Cloud Point (°F.) | | 21.4 |
| CFPP (°F.) | | 14 |
| Pour Point (°F.) | | 10 |
| Distillation (°F.; D 86) | IBP | 340 |
| | 10% | 439 |
| | 50% | 534 |
| | 90% | 640 |
| | FBP | 693 |

TEST PROCEDURES

The cloud point of the additized distillate fuel was determined using an automatic cloud point test based on the commercially available Herzog cloud point tester; test cooling rate is approximately 1° C./minute. Results of this test protocol correlate well with ASTM D2500 methods. The test designation (below) is "HERZOG".

The low-temperature filterability was determined using the Cold Filter Plugging Point (CFPP) test. This test procedure is described in "Journal of the Institute of Petroleum", Volume 52, Number 510, June 1966, pp. 173–185.

Test results are recorded in Table 1.

The products of this invention represent a significant new generation of wax crystal modifier additives which are dramatically more effective than may previously known additives. They represent a viable alternative to the use of kerosene in improving diesel fuel low-temperature performance.

TABLE 1

MODIFIED POLYESTERS CONTAINING URETHANE FUNCTIONAL GROUPS.
CATEGORIES A, B (See below).

| ENTRY | EPOXIDE | URETHANE PRECURSOR | ANHYDRIDE | MOLE RATIO | PERFORMANCE IMPROVEMENT (F): CLOUD POINT (HERZOG) | CFPP |
|---|---|---|---|---|---|---|
| CATEGORY A: ISOCYANATE/ANHYDRIDE MIXTURES FUEL B; 500 ppm ADDITIVE | | | | | | |
| 75 | VIKOLOX 18 | PHENYLISOCYANATE | PHTHALIC ANHY | 1/0.1/0.9 | 3.5 | 6 |
| 76 | VIKOLOX 18 | PHENYLISOCYANATE | PHTHALIC ANHY | 1/0.25/0.75 | 3.5 | 7 |
| 77 | VIKOLOX 18 | C18-ISOCYANATE | | 1/1 | 1.1 | 2 |
| 78 | VIKOLOX 18 | C18-ISOCYANATE | PHTHALIC ANHY | 1/0.2/0.9 | 3.6 | 6 |

TABLE 1-continued

MODIFIED POLYESTERS CONTAINING URETHANE FUNCTIONAL GROUPS.
CATEGORIES A, B (See below).

| ENTRY | EPOXIDE | URETHANE PRECURSOR | ANHYDRIDE | MOLE RATIO | PERFORMANCE IMPROVEMENT (F): CLOUD POINT (HERZOG) | CFPP |
|---|---|---|---|---|---|---|
| 79 | VIKOLOX 18 | C18-ISOCYANATE | PHTHALIC ANHY | 1/0.25/0.75 | 3.1 | 6 |
| CATEGORY B: MIXED ANHYDRIDES FUEL B: 500 ppm ADDITIVE | | | | | | |
| 80 | VIKOLOX 18 | ISATOIC ANHY | | 1/1 | 0.7 | 0 |
| 81 | VIKOLOX 18 | ISATOIC ANHY | PHTHALIC ANHY | 1/0.1/0.9 | 3.1 | 4 |
| 82 | VIKOLOX 18 | ISATOIC ANHY | PHTHALIC ANHY | 1/0.02/0.98 | 3.6 | 5 |
| 83 | VIKOLOX 18 | ISATOIC ANHY | C18-24 SUCCINIC ANHY | 1/0.1/0.9 | 3.6 | 4 |
| 84 | VIKOLOX 18 | ISATOIC ANHY | C18-24 SUCCINIC ANHY | 1/0.25/0.75 | 3.2 | 4 |

APPENDIX 1. GLOSSARY

CFPP: cold filter plugging point
DMAP: 4-dimethylamino-pyridine
Herzog: cloud point test; Herzog method
Isatoic anhydride: 2H-3,1-benzoxazine-2,4-dione (internal carbonyl adduct of 2-amino-benzoic acid)
Phthalic anhydride: 1,2-benzenedicarboxylic anhydride
Vikolox "N": Linear 1,2-epoxyalkane, where N=the carbon number of the alkyl chain; N=12, 14, 16, 18, 20, 20-24, 24∝28, 30+.

Although the present invention has been described with preferred embodiments, it is to be understood that modifications and variations may be resorted to, without departing from the spirit and scope of this invention, as those skilled in the art will readily understand. Such variations and modifications are considered within the purview and scope of the appended claims.

What is claimed is:

1. A multifunctional low-temperature-modifying distillate fuel additive consisting of a polymeric and/or oligomeric ester/urethane additive product of reaction prepared by polymerizing or oligomerizing a suitable combination of monomers selected from the group consisting of (1) one or more long-chain epoxides or diol equivalents, (2) one or more anhydrides or diacid equivalents, (3) a urethane precursor selected from isocyanates, diisocyanates or an activated carbamate or mixtures of (1), (2) or (3), and (4) optionally a suitable reactive material selected from the group consisting of epoxy halides, diepoxides, dianhydrides or polyols, in varying molar ratios under suitable conditions of time, temperature and pressure and wherein the molar ratios of reactants vary from equimolar to more than molar to less than molar, at temperatures varying from about 50° to about 250° C. and with pressures varying from atmospheric to slightly higher for times varying from about an hour to 48 hours or more thereby producing the desired ester/urethane additive products said products containing polymeric structures having ester and urethane functions and long-chain hydrocarbyl groups independently and regularly spaced along the polymer backbone and wherein hydrocarbyl is selected from the group consisting of alkyl, alkenyl, aryl, alkaryl, aralkyl, which may be cyclic or polycyclic and wherein said ester additive product is (5) optionally post reacted with suitable reactive amines, alcohols or a mixture of such amines and alcohols.

2. The additive product of reaction of claim 1 wherein said additive is prepared from monomers selected from the group consisting of (1) epoxides, at least one of which is long-chain, anhydrides and isocyanate mixtures, (2) epoxides, at least one of which is long-chain ($C_{12}$), anhydrides and isatoic anhydride mixtures.

3. The additive product of reaction of claim 2 wherein said products described therein as prepared from said monomers or as post reacted oligomeric or polymeric esters thereof prepared from (1) 1,2-epoxyoctadecane, phenylisocyanate and phthalic anhydride; (2) 1,2-epoxyoctadecane and C18 isocyanate; (3) 1,2-epoxyoctadecane, C18 isocyanate and phthalic anhydride; (4) 1,2-epoxyoctadecane and isatoic anhydride; (5) 1,2-epoxyoctadecane, isatoic anhydride and phthalic anhydride and (6) 1,2-epoxyoctadecane, isatoic anhydride and C18 to C24 succinic anhydride.

4. The additive product of claim 1 wherein at least one of said monomers and optionally more than one, has a pendant hydrocarbyl group of at least $C_{12}$ or longer.

5. The additive product of claim 1 wherein the monomers are phthalic anhydride, octadecylisocyanate and 1,2-epoxyoctadecane.

6. The additive product of claim 1 wherein the monomers are $C_{18}$–$C_{24}$ alkyl succinic anhydride, isatoic anhydride and 1, 2-epoxyoctadecane.

7. A process of preparing a multifunctional low-temperature modifying distillate fuel polymeric and/or oligomeric ester/urethane product of reaction comprising polymerizing or oligomerizing a suitable combination of monomers selected from the group consisting of (1) one or more long-chain epoxides or diol equivalents (2) one or more anhydrides or diacid equivalents or mixtures of (1) and (2), and (3) a urethane precursor selected from the group consisting of isocyanates, diisocyanates, isatoic anhydride or activated carbamates and (4) optionally with a suitable reactive material selected from the group consisting of epoxy halides, diepoxides, dianhydrides or polyols, in varying molar ratios under suitable conditions of time, temperature and pressure and wherein the molar ratios of reactants varies from equimolar to more than molar to less than molar, at temperatures varying from about 50° to about 250° C. and with pressures varying from atmospheric to slightly higher for times varying from about an hour to 48 hours or more thereby producing the desired ester/urethane additive product said product containing polymeric structures having ester and urethane functions and long-chain hydrocarbyl groups independently and regularly spaced along the polymer backbone and wherein hydrocarbyl is selected from the group consisting of alkyl, alkenyl, aryl, aralkyl, alkaryl, which may be cyclic or polycyclic and wherein said ester additive product of reaction is (5) optionally post reacted with a suitable reagent selected from suitable reactive amines and alcohols or mixtures of such amines and alcohols.

8. The process of claim 7 wherein at least one of said monomers and optionally more than one, has a pendant hydrocarbyl group of at least $C_{12}$ or longer.

9. The process of claim 7 wherein the monomers are phthalic anhydride, 1,2-epoxyoctadecane and octadecylisocyanate.

10. The process of claim 7 wherein the monomers are isatoic anhydride, a mixture of $C_{18}$-$C_{24}$ alkyl succinic anhydride and 1,2-epoxyoctadecane.

11. A fuel additive concentrate comprising a suitable major amount of a liquid hydrocarbon solvent having dissolved therein a minor amount of a low-temperature modifying fuel additive product of reaction as claimed in claim 1.

12. The fuel additive concentrate of claim 11 wherein a concentrate having a total volume of about 100 ml, contains about 10 g of said additive product of reaction dissolved therein.

13. The fuel additive concentrate of claim 11 wherein said solvent is selected from the group consisting of xylene, mixed xylenes and toluene.

14. A liquid hydrocarbyl fuel composition comprising a major amount of said fuel and a minor amount of a multifunctional low-temperature modifying distillate fuel additives comprising a polymeric and/or oligomeric ester/urethane additive product of reaction prepared by polymerizing or oligomerizing a suitable combination of monomers selected from the group consisting of (1) one or more long-chain epoxides or diol equivalents, (2) one or more anhydrides or diacid equivalents, and (3) a urethane precursor selected from the group consisting of isocyanates, diisocyanates, or activated or isatoic anhydride and (4) optionally a suitable reactive material selected from the group consisting of epoxy halides, diepoxides, dianhydrides or polyols, in varying molar ratios under suitable conditions of time, temperature and pressure and wherein the molar ratios of reactants varies from equimolar to more than molar to less than molar, at temperatures varying from about 50° to about 250° C. and with pressures varying from atmospheric to slightly higher for times varying from about an hour to 48 hours or more thereby producing the desired ester/urethane additive product said product containing polymeric structures having ester/urethane functions and long-chain hydrocarbyl groups independently and regularly spaced along the polymer backbone and wherein hydrocarbyl is selected from the group consisting of alkyl, alkenyl, aryl, alkaryl, aralkyl and my be cyclic or polycyclic and wherein said ester/urethane additive product of reaction is (5) post reacted with a suitable reagent selected from suitable amines and alcohols or a mixture of such amines and alcohols.

15. The fuel composition of claim 14 wherein the additive product of reaction is prepared from monomers selected from the group consisting of (1) anhydrides and epoxides as comonomers, (2) mixed epoxides and anhydrides as comonomers, (3) mixed anhydrides and epoxides as comonomers or are (5) post reacted oligomeric or polymeric esters.

16. The fuel composition of claim 15 wherein the additive products of reaction described therein as prepared from (1) anhydrides, isocyanates and epoxide comonomers, prepared from (a) 1,2-epoxyoctadecane, phenylisocyanate and phthalic anhydride; (b) 1,2-epoxyoctadecane and C18 isocyanate; (c) 1,2-epoxyoctadecane, C18 isocyanate and phthalic anhydride; (2) epoxides, anhydrides and isatoic anhydrides, prepared (a) 1,2-epoxyoctadecane and isatoic anhydride; (b) 1,2-epoxyoctadecane, isatoic anhydride and phthalic anhydride and (c) 1,2-epoxyoctadecane, isatoic anhydride and C18 to C24 succinic anhydride or are post reacted oligomeric or polymeric esters.

17. The fuel composition of claim 15 wherein at least one of said monomers and optionally more than one, has a pendant hydrocarbyl group of at least $C_{12}$ or longer.

18. The fuel composition of claim 15 wherein the monomers are phthalic anhydride, 1,2-epoxyoctadecane and octadecylisocyanate.

19. The fuel composition of claim 15 wherein the monomers are a mixture of $C_{18}$-$C_{24}$ alkyl succinic anhydrides, isatoic anhydride and 1,2-epoxyoctadecane.

20. The fuel composition of claim 15 comprising from about 0.001 to about 10% by weight based on the total weight of the composition, of the ester additive product of reaction.

* * * * *